United States Patent
Nomiyama et al.

(10) Patent No.: US 7,428,983 B2
(45) Date of Patent: *Sep. 30, 2008

(54) BANKNOTE RECEIPT AND PAYOUT APPARATUS

(75) Inventors: Akira Nomiyama, Kashiwa (JP); Riichi Katou, Nagoya (JP)

(73) Assignee: Hitachi-Omron Terminal Solutions Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/257,016

(22) Filed: Oct. 25, 2005

(65) Prior Publication Data

US 2006/0032913 A1 Feb. 16, 2006

Related U.S. Application Data

(62) Division of application No. 10/424,069, filed on Apr. 28, 2003, now Pat. No. 6,968,997.

(30) Foreign Application Priority Data

Feb. 10, 2003 (JP) .............................. 2003-031842

(51) Int. Cl.
- *G06Q 40/00* (2006.01)
- *G07D 11/00* (2006.01)
- *G07F 19/00* (2006.01)
- *G06K 5/00* (2006.01)
- *G07B 15/00* (2006.01)
- *B65H 31/26* (2006.01)

(52) U.S. Cl. .................. 235/379; 235/380; 232/15; 271/220; 902/8; 902/9; 902/12; 902/13; 902/14; 902/15; 705/43

(58) Field of Classification Search ................. 271/220; 232/1 D, 15, 16; 705/43–45; 194/215; 235/379–381; 902/8, 9, 11, 12–15, 30; 109/24.1, 46, 47, 109/53, 58

See application file for complete search history.

(56) References Cited

U.S. PATENT DOCUMENTS 3,635,321 A 1/1972 Frazier (Continued)

FOREIGN PATENT DOCUMENTS

EP 0907152 4/1999

(Continued)

*Primary Examiner*—Daniel I Walsh
(74) *Attorney, Agent, or Firm*—Antonelli, Terry, Stout & Kraus, LLP.

(57) ABSTRACT

Provided is a banknote receipt and payout apparatus which handles several denominations, having a banknote loading and collecting function, and which is capable of handling several denominations. A banknote receipt and payout apparatus comprising a receipt and payout opening for paying out banknotes introduced thereinto by a user, and for stacking therein banknotes to be delivered to a user, a banknote checking part for checking banknotes, a banknote storage and discharge bin for carrying one or both of storing and discharging of banknote notes, a loading and collecting bin 8 for loading and collecting banknotes, and a transfer path for transferring banknotes, wherein the banknote storage and discharge bin is of a vertical type in which banknotes are stacked in a horizontal posture, and the loading and collecting bin is of a horizontal type in which banknotes are stacked in a standing posture.

6 Claims, 14 Drawing Sheets

U.S. PATENT DOCUMENTS

| | | | |
|---|---|---|---|
| 4,253,016 A | | 2/1981 | Hirose |
| 4,465,192 A | | 8/1984 | Ohba et al. |
| 4,585,144 A | * | 4/1986 | Granzow et al. ............... 221/7 |
| 4,625,870 A | * | 12/1986 | Nao et al. .................... 209/534 |
| 4,629,382 A | | 12/1986 | Ueshin |
| 4,760,923 A | * | 8/1988 | Lundblad et al. ............. 209/534 |
| 4,874,931 A | * | 10/1989 | Oka et al. .................... 235/379 |
| 4,972,958 A | | 11/1990 | Ito et al. |
| 4,980,543 A | * | 12/1990 | Hara et al. ................... 235/379 |
| 4,982,947 A | * | 1/1991 | Milne ......................... 271/263 |
| 5,000,322 A | | 3/1991 | Goi |
| 5,021,639 A | * | 6/1991 | Hara et al. ................... 235/379 |
| 5,553,320 A | * | 9/1996 | Matsuura et al. ............. 235/379 |
| 5,626,822 A | | 5/1997 | Kadowaki et al. |
| 5,662,202 A | | 9/1997 | Suris |
| 5,788,348 A | * | 8/1998 | Ramachandran et al. .. 312/223.1 |
| 5,984,177 A | * | 11/1999 | Do et al. ..................... 235/379 |
| 6,006,209 A | * | 12/1999 | Takeuchi et al. .............. 705/40 |
| 6,073,837 A | | 6/2000 | Milne |
| 6,164,585 A | | 12/2000 | Lutz |
| 6,170,822 B1 | * | 1/2001 | Kato et al. .................... 271/298 |
| 6,189,881 B1 | | 2/2001 | Bolton et al. |
| 6,196,457 B1 | * | 3/2001 | Patterson .................... 235/379 |
| 6,276,678 B1 | | 8/2001 | Nottelmann et al. |
| 6,454,163 B2 | * | 9/2002 | Peebles et al. ............... 235/379 |
| 6,481,620 B1 | | 11/2002 | Katou et al. |
| 6,510,985 B1 | * | 1/2003 | Clark et al. .................. 235/379 |
| 6,540,136 B1 | * | 4/2003 | Ross .......................... 235/379 |
| 6,779,728 B2 | | 8/2004 | Nomiyama et al. |
| 6,889,898 B2 | | 5/2005 | Katou et al. |
| 6,968,997 B2 | * | 11/2005 | Nomiyama et al. ......... 235/381 |
| 7,293,699 B2 | * | 11/2007 | Jenkins et al. .............. 235/379 |
| 2002/0003163 A1 | * | 1/2002 | Peebles et al. .............. 235/379 |
| 2002/0014736 A1 | * | 2/2002 | Katou et al. ................. 271/126 |
| 2002/0082962 A1 | | 6/2002 | Farris et al. |
| 2002/0084570 A1 | * | 7/2002 | Kayani .................... 271/10.01 |
| 2002/0088850 A1 | | 7/2002 | Katou et al. |
| 2002/0092905 A1 | | 7/2002 | Katou et al. |
| 2002/0170956 A1 | | 11/2002 | Katou et al. |
| 2003/0014395 A1 | | 1/2003 | Hallowell et al. |
| 2003/0047601 A1 | * | 3/2003 | Nomiyama et al. ......... 235/381 |
| 2003/0120936 A1 | | 6/2003 | Farris et al. |
| 2003/0127509 A1 | * | 7/2003 | Nomiyama et al. ......... 235/379 |
| 2004/0011622 A1 | | 1/2004 | Omori et al. |
| 2004/0108648 A1 | * | 6/2004 | Iida ........................ 271/10.09 |
| 2004/0155105 A1 | * | 8/2004 | Nomiyama et al. ......... 235/381 |
| 2004/0172730 A1 | | 9/2004 | Washington et al. |
| 2004/0173672 A1 | | 9/2004 | Washington et al. |
| 2004/0205024 A1 | * | 10/2004 | Washington et al. .......... 705/43 |
| 2004/0205025 A1 | | 10/2004 | Takeuchi et al. |
| 2004/0256784 A1 | * | 12/2004 | Nomiyama et al. ........ 271/3.14 |
| 2005/0023341 A1 | | 2/2005 | Taniyama et al. |
| 2005/0127590 A1 | * | 6/2005 | Ugo et al. ..................... 271/96 |
| 2005/0189266 A1 | * | 9/2005 | Fujita et al. ................. 209/534 |
| 2005/0200072 A1 | * | 9/2005 | Sawayama et al. .......... 271/207 |
| 2005/0203846 A1 | * | 9/2005 | Noguchi ..................... 705/42 |
| 2006/0032913 A1 | * | 2/2006 | Normiyama et al. ........ 235/381 |
| 2008/0061127 A1 | * | 3/2008 | Brexel ....................... 235/379 |

FOREIGN PATENT DOCUMENTS

| | | |
|---|---|---|
| EP | 1219557 | 7/2002 |
| JP | 04-125237 | 4/1992 |
| JP | 097270045 | 10/1997 |
| JP | 10003563 | 1/1998 |
| JP | 410003563 * | 1/1998 |
| JP | 11-110607 | 4/1999 |

* cited by examiner

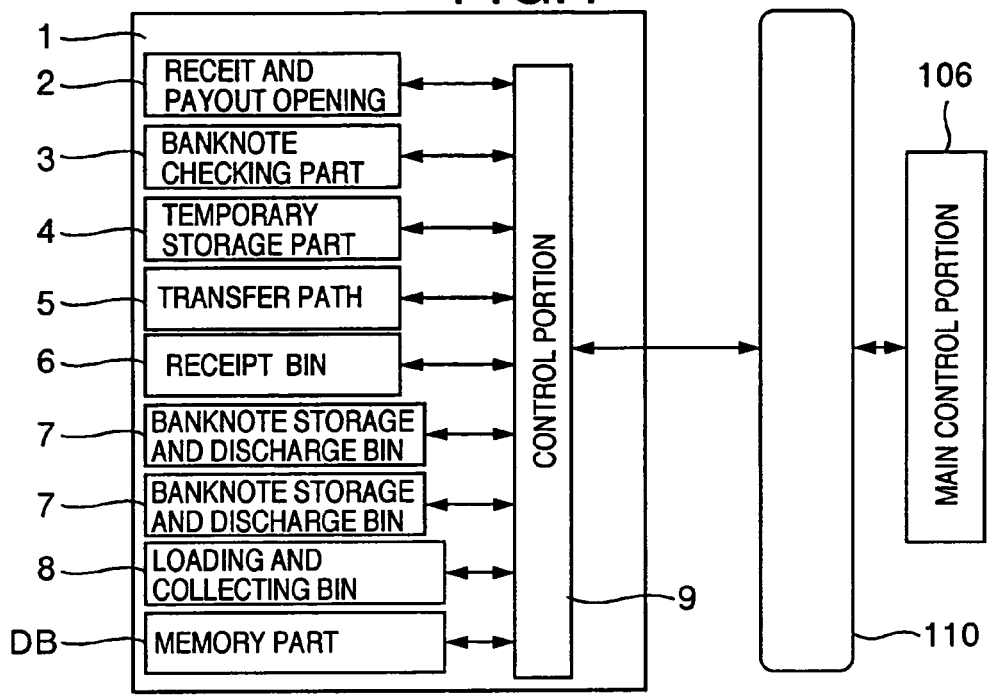
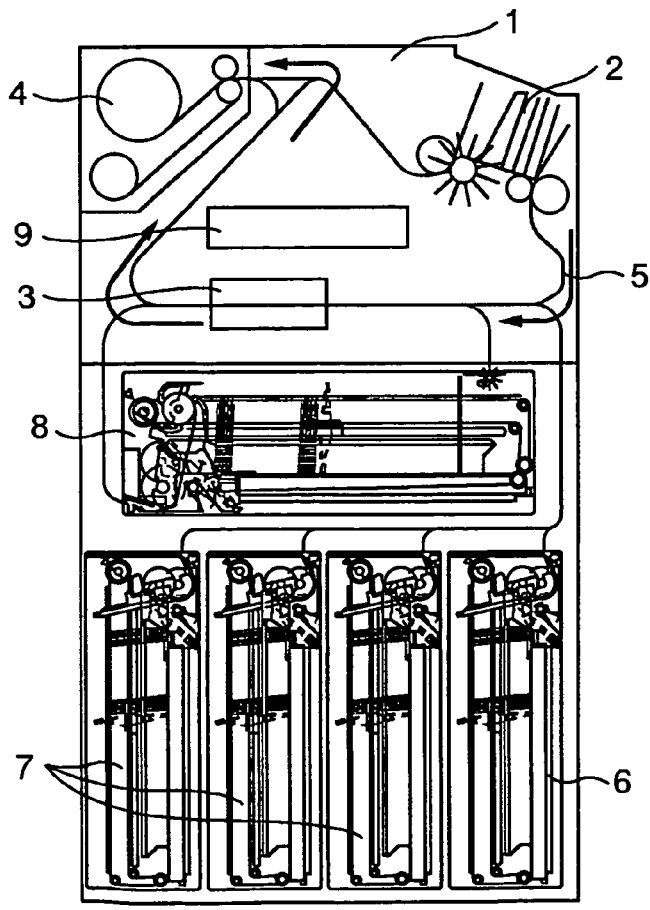

BANKNOTE RECEIPT AND PAYOUT APPARATUS

CROSS-REFERENCE TO RELATED APPLICATIONS

This application is a divisional application of application Ser. No. 10/424,069, filed Apr. 28, 2003, now U.S. Pat. No. 6,968,997, the contents of which are incorporated herein by reference in their entirety.

BACKGROUND OF THE INVENTION

The present invention relates to a banknote receipt and payout apparatus for using receipt banknotes as payout banknotes.

RELATED ART

These years, there has been a growing need for handling banknotes in various foreign currencies in domestic areas and cash through automatic teller machines in oversea areas and so forth. Accordingly, it has been being necessary to handle not only Japanese yen banknotes but also foreign banknotes, that is, it has been being demanded to increase the number of denominations of banknotes to be handled.

For example, as prior art, JP-A-11-110607 discloses a configuration capable of handling several denominations of banknotes.

This configuration of prior art incorporates a mechanism portion composed of a receipt and payout opening, a temporary storage bin, a banknote checking part and the like, and the mechanism portion is coupled with several banknote storage bins through the intermediary of a loop-like transfer path.

Further, it also discloses such a configuration that an automatic teller machine is composed of an upper mechanism portion including the receipt and payout opening, the temporary storage bin and the banknote checking part, and a safe-like lower mechanism part composed of the banknote storage bins accommodated in a housing.

Further, it discloses an automatic teller machine in which several banknote storage bins are arranged, being juxtaposed in the case of a large number of banknote storage bins.

The automatic teller machine discloses in the above-mentioned document JP-A-11-110607 has such a structure that several banknote storage bins are arranged being juxtaposed in order to increase the number of denominations of banknotes to be handled.

In order to increase the number of denominations to be handled, the number of banknotes storage bins for storing and discharging the banknotes must be increased.

In an automatic teller machine, as disclosed in JP-A-11-110607, in which the banknote storage bins are arranged being juxtaposed, the banknote storage bins are vertically stacked one upon another as the number of denominations to be handled is increased. In other words, the overall height of the teller machine and the height of the receipt and payout opening become higher, as a result, there would be raised such problems that the teller machine can hardly be installed, and that the manipulatablility of the teller machine becomes worse. These problems are caused such a fact that the banknote storage bin is formed of a sidelong type banknote cassette in which banknotes are stacked in a standing posture.

Meanwhile, the loading of banknotes into the teller machine is carried out in such a way that a loading and collecting bin in which the banknotes are stacked is mounted in the teller machine, and then the banknotes are transferred from the loading and collecting bin into the banknote cassettes. Further, the collection of the banknotes from the teller machine is carried out such a way that the banknotes from the banknotes cassettes are transferred and stored into an empty loading and collecting bin which is installed in the teller machine.

The above-mentioned loading and collecting bin has to handle a plurality of denominations, that is, intermingled banknotes to be stored and discharged, having different sizes. In the case of a vertical loading and collecting bin in which the banknotes are stacked in a horizontal posture, if banknotes having different sizes are stored therein, banknotes having a smaller size are not restrained within the banknote loading and collecting bin, and accordingly, they are stacked in disorder, thereby normal execute operation becomes impossible.

That is, in order to store or discharge intermingled banknotes having different sizes, it is necessary to align the banknotes with one another at their one end. Thus, the loading and collecting bin must be sidelong so that the banknotes are stacked in a standing posture and are aligned at their lower end.

BRIEF SUMMARY OF THE INVENTION

An object of the present invention is to provide a banknote receipt and payout apparatus which can handle a large number of denominations of banknotes, which has a function capable of loading and collecting banknotes and which can accept several denominations of banknotes.

The above-mentioned object can be achieved by a banknote receipt and payout apparatus comprising an receipt and payout opening for carrying out either or both of payout and stacking of charged banknotes, a banknote checking part for checking denominations of the banknotes, at least one of banknote storage and discharge bins for carrying out either or both of storage and discharge of the banknotes, a transfer path connecting the receipt and payout opening, the banknote checking part and the banknote storage and discharge bins to one another, for transferring the banknotes, and a loading and collecting bin for loading and collecting the banknotes into and from the banknote storage and discharge bin, wherein the banknote storage and discharge bin stacks therein banknotes in a vertical direction, and the loading and collecting bin stacks therein banknotes in a horizontal direction therein with a standing posture.

Further, the above-mentioned object can be achieved by the above-mentioned loading and collecting bin which can be pulled out from the banknote receipt and payout apparatus.

Further, the above-mentioned object can be achieved by banknote storage and discharge bins having a number corresponding to a number of denominations of banknotes to be handed, and arranged being horizontally juxtaposed.

Further, the above-mentioned object can be achieved by the loading and collecting bin which can be taken out from the banknote receipt and payout apparatus, longitudinally thereof.

The present invention will be detailed in the form of preferred embodiments in order to facilitate the understanding of the invention with reference to accompanying drawings. However, the technical concept of the present invention should not be limited to these embodiments, but can be changed or modified with the scope defined by the appended claims.

Other objects, features and advantages of the invention will become apparent from the following description of the embodiments of the invention taken in conjunction with the accompanying drawings.

BRIEF DESCRIPTION OF SEVERAL VIEWS OF THE DRAWINGS

FIG. 4 is a block diagram illustrating a control mechanism in the banknote receipt and payout apparatus incorporating an embodiment;

FIG. 5 is a section view illustrating the banknote receipt and payout apparatus during receipt operation in an embodiment;

DETAILED DESCRIPTION OF THE INVENTION

Figure 1:
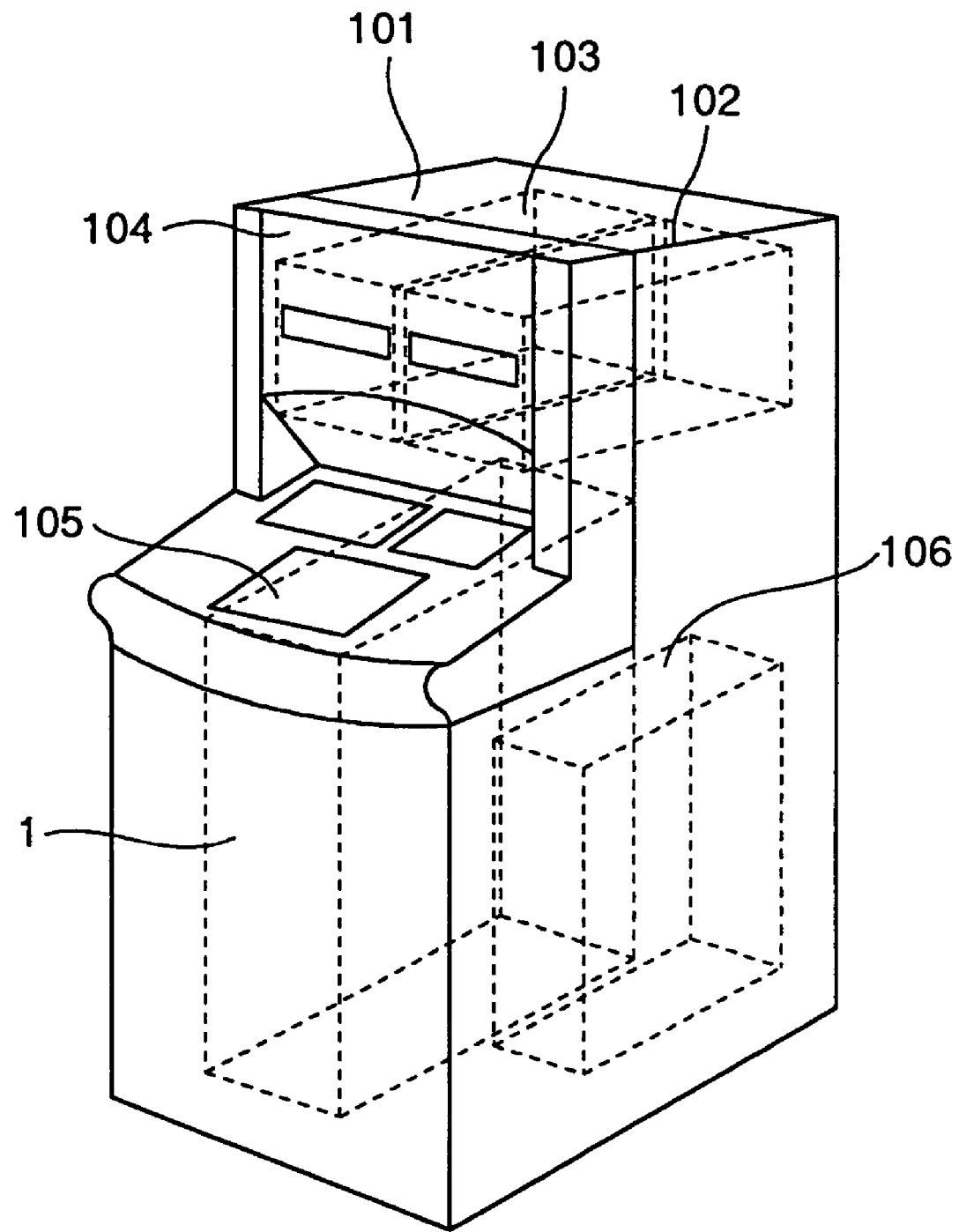
FIG. 1 is an external perspective view illustrating an automatic teller machine to which the present invention is applied.

FIG. 1 is a view of illustrating an external appearance of an automatic teller machine in which the present invention is applied.

Referring to FIG. 1, the automatic teller machine 102 in this embodiment is composed of a card/slip processing mechanism 101 for processing a customer's transaction card or a transaction slip a bankbook processing mechanism 103 for processing a bankbook, a housing 104, a customer manipulation panel 105 through which data required for transaction is displayed and inputted, and a banknote receipt and payout apparatus 1. Reference numeral 106 denotes a main control portion for controlling the operation of the banknote receipt and payout apparatus 1.

Figure 2:
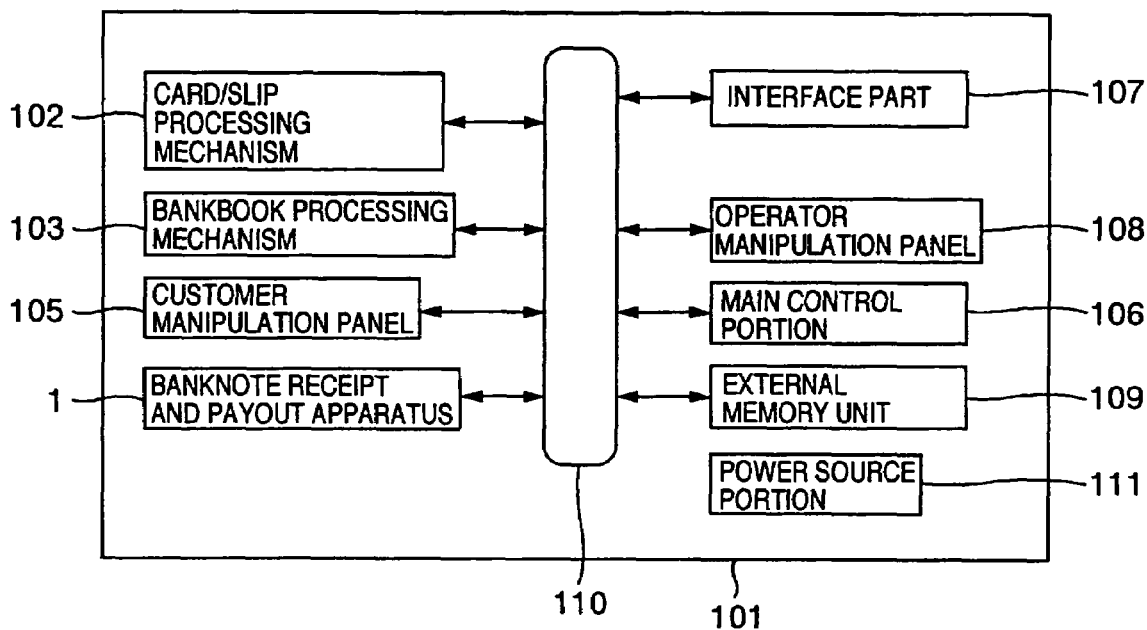
FIG. 2 is a block diagram illustrating a control mechanism in the automatic teller machine to which the present invention is applied.

FIG. 2 is a block diagram which shows a control relationship in the automatic teller machine 101.

Referring to FIG. 2, the card/slip processing mechanism 102, the bankbook processing mechanism 103, the customer manipulation panel 105 and the banknote receipt and payout apparatus 1 are connected to the main control portion 106 through the intermediary of a bus 110, and are operated under the control of the main control portion 106. In addition to the above-mentioned components, an interface portion 107, an operator manipulation panel 108 and an external storage unit 109 are also connected to the main control portion 106 so as to transmit required data thereamong, but detailed description will be omitted. It is noted that the above-mentioned mechanisms and components are fed with a power from a power source 111.

Figure 3:
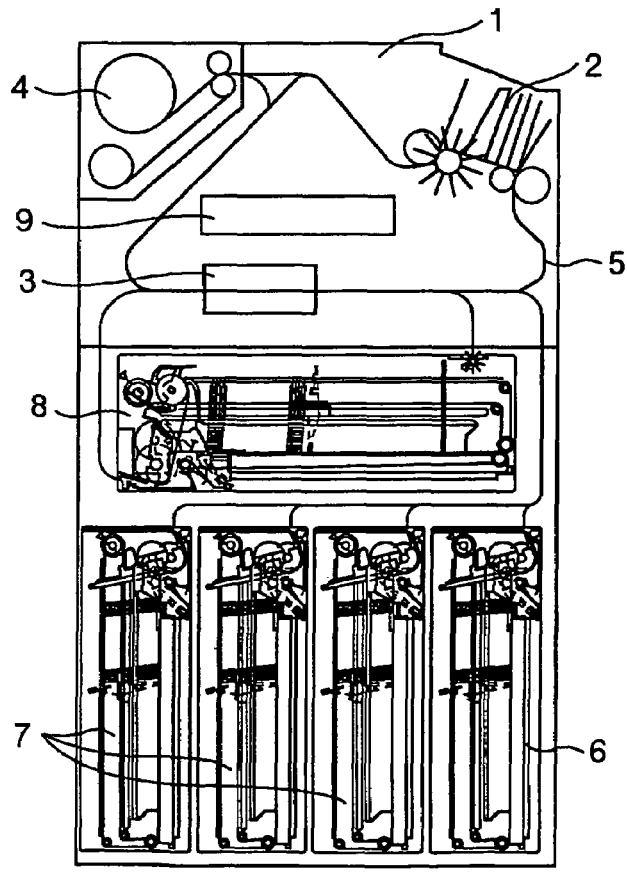
FIG. 3 is a sectional view illustrating a banknote receipt and payout apparatus.

FIG. 3 is a configuration of the banknote receipt and payout apparatus 1 mounted in the automatic teller machine 101, and FIG. 4 is a block diagram which shows a control mechanism.

Referring to FIGS. 3 and 4, the banknote receipt and payout apparatus 1 comprises a receipt and payout opening 2 for charging and discharging banknotes, a banknote checking part 3 for determining a denomination of a banknote or checking whether a banknote is true or false, a temporary storage part 4 for temporarily storing therein a charged banknote until completion of transaction, a transfer path 5 coupling the components in the banknote receipt and payout apparatus 1 with one another for transferring banknotes, and banknote cassettes in which banknotes to be handled in the banknote receipt and payout apparatus 1 are stopped. These banknote cassettes are classified in view their roles.

A receipt bin is a storage bin for banknotes which are determined to be received therein but not paid out therefrom as being inappropriate for payout as it is folded or broken. Further, this receipt bin is used for receipt of a banknote but do not for payout the banknote such as a five thousand yen banknote.

If this receipt bin is used for foreign currency banknotes having different sizes among several denominations, it receives banknotes having various sizes. However, it is not necessary to align the banknotes at its one side end since the banknotes received therein will not be used as payout banknotes, and accordingly, they may be simply stacked one upon another. Accordingly, this receipt bin may be of a vertical type.

The storage and discharge bins are safes for storing and discharge banknotes having different denominations, respectively, for receipt and payout thereof. For example, one of them is for thousand yen banknotes, and another one of them is for ten thousand yen banknotes or the like.

The loading and collecting bin is a safe for carrying out loading and collection, which is a banknote cassette for storing and discharging intermingled banknotes to be handled in the banknote receipt and payout apparatus 1.

In this embodiment, there are incorporated the receipt bin 6, the storage and discharge bins 7 and the loading and collecting bin 8, and in the embodiment as shown in FIG. 3, the receipt bin 6 and the storage and discharge bins 7 are banknotes cassettes which are of vertical type, in which banknotes are stored in a horizontal posture. The loading and collecting bin 8 is a horizontal banknote cassette 7 in which banknotes are stored in a standing posture.

It is noted that the loading and collecting bin 8 can be slid toward the left side and the right side in FIG. 3 so as to be taken out from the banknote receipt and payout apparatus 1. Thus, after completion of service of the automatic teller machine, the operator can take out the loading and collecting bin 8 from the front part or the rear part of the automatic teller machine 101 after banknotes remaining in the receipt bin 6 and the banknote storage and discharge bins 7 are collected in the loading and collecting bin 8, and then the operator keeps the loading and collecting bin 8 to be in custody at a predetermined place.

The loading and collecting bin 8 in custody is returned into the automatic teller machine 101 before a start of the service in the next morning, and banknotes are stored in the receipt bin 6 and the banknote storage and discharge bin 7.

By the way, domestic automatic banknote teller machines in Japan are designed only for Japanese currency banknotes to be handled. The Japanese currency banknotes including a thousand yen banknote and a ten thousand banknote have one and the same size in the short side direction, and accordingly, the Japanese currency banknotes can be vertically stacked one upon another without being deviated from one another even though the loading and collecting bin which holds therein them of all denominations is laid vertically.

However, if oversea currency banknotes are stored in this loading and collecting bin, the following problem is raised:

Oversea currency banknotes have different sizes in not only a long side direction but also a short side direction, and accordingly, should such oversea currency banknotes be stacked one upon another in a vertical loading and correcting bin, banknotes other than those having a largest size cannot be set in position, resulting in occurrence of problems of clogging of banknotes and of double discharge during loading and collection of banknotes.

Thus, as may be construed, it has been better to banknotes in a standing posture so as to make contact at their longitudinal side with a reference surface in the case of the oversea currency banknotes.

The above-mentioned receipt and bin 6 and the banknote storage and discharge bins 7 are arranged vertically (banknotes are stored being stacked one upon another). This is because the receipt bin 6 and the storage and discharge bins 7 are independent from one another among denominations.

The banknote receipt and payout apparatus 1 incorporates, as shown in FIG. 4, a memory portion DB which stores therein a corresponding relationship between denominations and sizes. With the provision of the memory portion DB, a size of a banknote can be determined by checking a denomination of the banknote. The control portion 9 is connected to the main control portion 106 through the intermediary of the bus 110, and accordingly, the control portion 9 controls the banknote receipt and payout apparatus 1 in accordance with an instruction from the main control portion 106 and a detected status of the banknote receipt and payout apparatus 1, and transmits a status of the banknote receipt and payout apparatus 1 to the main control portion as necessary.

<Receipt Operation>

Explanation will be hereinbelow made of receipt operation in this embodiment with reference to FIGS. 5 to 7.

FIG. 5 is a sectional view illustrating the automatic teller machine during receipt operation.

Figure 6:
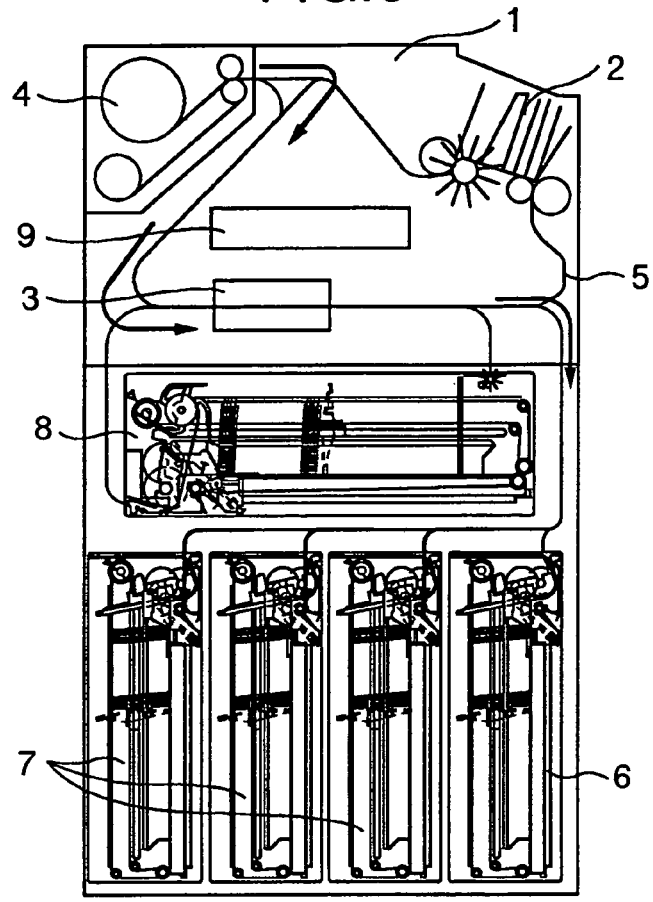
FIG. 6 is a section view illustrating the banknote receipt and payout apparatus during receipt operation in an embodiment.

FIG. 6 is a sectional view illustrating the automatic teller machine during receipt operation.

Figure 7:
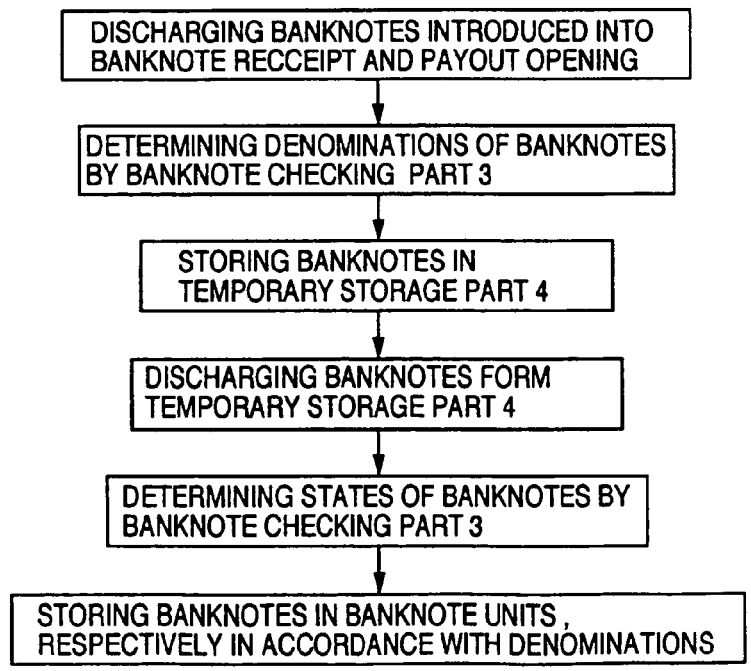
FIG. 7 is a flow chart for receipt operation in an embodiment.

FIG. 7 is a flow-chart for explaining the receipt operation in this embodiment.

Referring to FIG. 5, banknotes introduced into the receipt and payout opening 2 are paid out onto the transfer path 5 as indicated by the arrows. When the banknotes paid out on the transfer path 5 are transferred in the direction of the arrows, the banknote checking part 3 determines denominations and a number of them, and thereafter, the banknotes are once stored in the temporary storage part 4.

Next, as shown in FIG. 6, the banknotes stored in the temporary storage part 4 are transferred in the direction of the arrow in this figure, and states thereof are checked by the banknote checking part 3. If a banknote to be rejected is present, it is stored in the receipt bin 6, but banknotes which are determined to be normal, are stored in the banknote storage and discharge bins 7, respectively in view of their denominations.

Although the content of the series of the above-mentioned receipt operation which is shown in the flow chart in FIG. 7 is similar to the explanation made with reference to FIGS. 5 and 6. However, explanation will be repeated briefly.

After the banknotes introduced in the receipt and payout opening 2 are stored in the temporary storage part 4 after their denomination are checked by the checking part 3. The banknotes from the temporary storage part 4 is checked in their status, and are stored in banknote units respectively in view of their denominations and their status.

<Payout Operation>

Next, explanation will be made of payout operation in this embodiment with reference to FIGS. 8 and 9.

Figure 8:
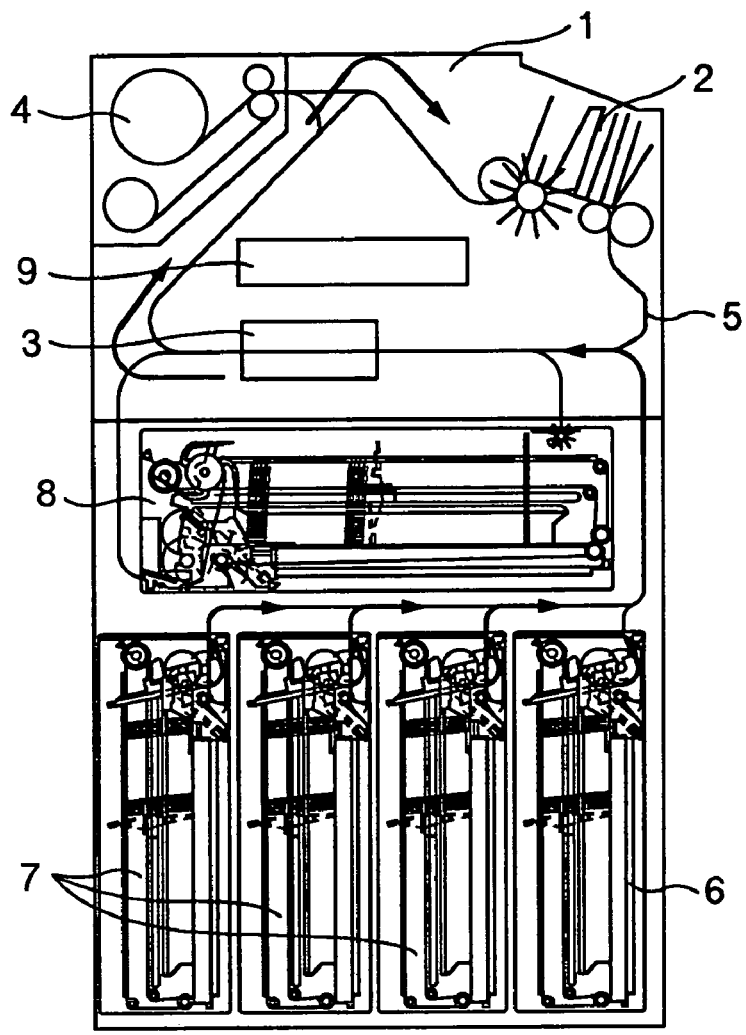
FIG. 8 is a sectional view illustrating a banknote receipt and payout apparatus during payout operation in an embodiment.

FIG. 8 is a sectional view illustrating the automatic teller machine during payout operation.

Figure 9:
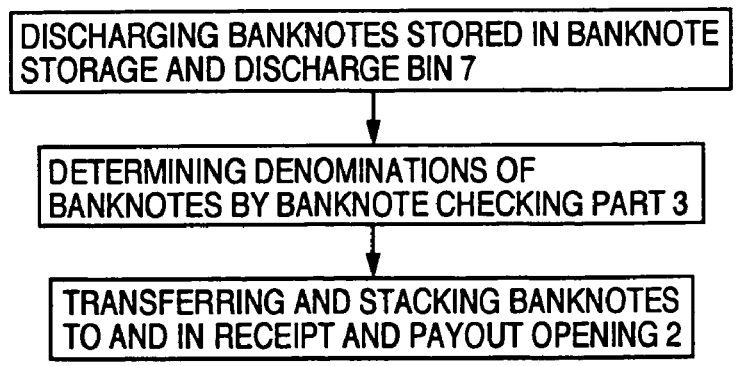
FIG. 9 is a flow chart for payout operation in an embodiment.

FIG. 9 is a flowchart for explaining payout operation in this embodiment.

Referring to FIG. 8, of banknotes stored in the banknote storage and discharge bins 7, those to be paid out are paid out onto the transfer path as indicated by the arrows. The banknotes paid out on the transfer path 5 are checked by the banknote checking part 3 so as to determine denominations and a number of them, and are then transferred into and staked in the receipt and payout opening.

Although the content of the series of the above-mentioned payout operation which is shown in the flow chart in FIG. 9 is similar to the explanation made with reference to FIG. 8. However, explanation will be repeated briefly.

The banknotes discharged from the banknote storage and discharge bins 7 are checked the banknote checking part so as to determine their denominations, and are then transferred into and stacked in the receipt and payout opening 2.

Next, explanation will be made of loading operation in this embodiment with reference to FIGS. 10 and 11.

Figure 10:
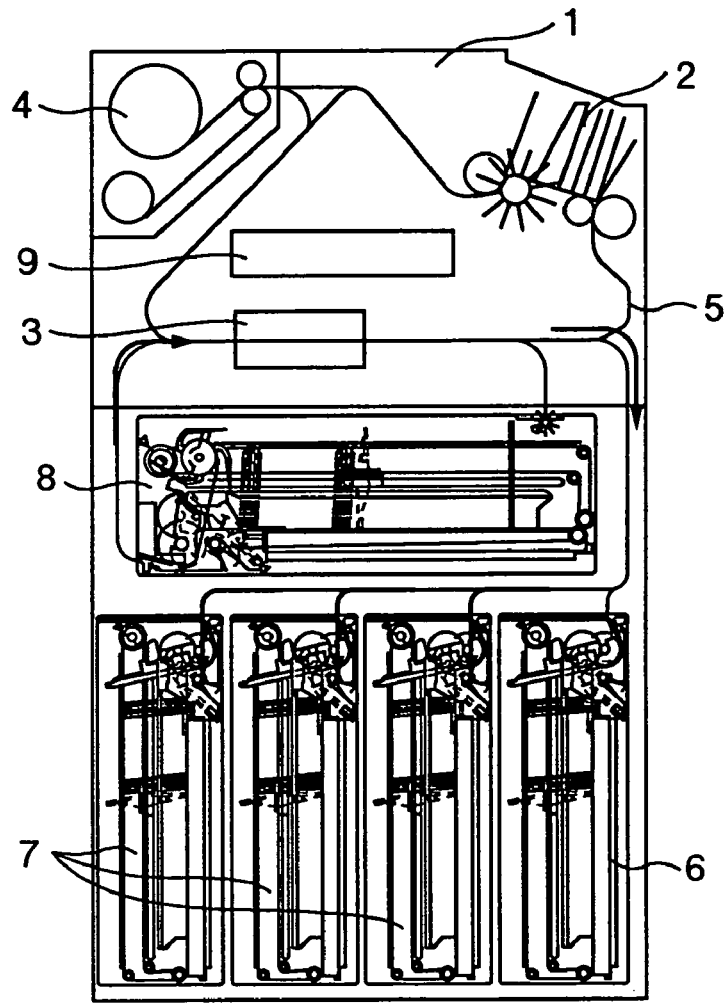
FIG. 10 is a sectional view illustrating a banknote receipt and payout apparatus during banknote loading operation in an embodiment.

FIG. 10 is a sectional view illustrating an automatic teller machine during loading operation.

Figure 11:
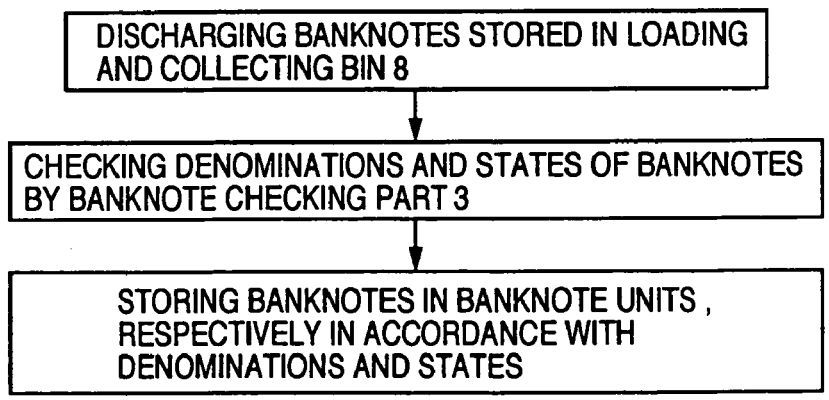
FIG. 11 is a flow chart for banknote loading operation in an embodiment.

FIG. 11 is a flow chart for explaining the loading operation in this embodiment.

Referring to FIG. 10, the loading operation is carried out in order to replenish the banknote receipt and payout apparatus 1 with banknotes when banknotes are loaded in the apparatus before the automatic teller machine 101 as shown in FIG. 1 comes into an operation, or when the number of banknotes in the apparatus becomes less on operation.

At first, the loading and collecting bin 8 is installed in the banknote receipt and payout apparatus 1. Then, banknotes are paid out from the loading and collecting bin 8, and denominations and states thereof are checked by the banknote checking part 3. Banknotes which have been determined to be normal, are stored in the banknote storage and discharge bins 7, respectively in accordance with their denominations, but banknotes which have been determined to be unusable, are stored in a reject banknote storage part 820 in the loading and collecting bin 8.

The series of loading operation will be explained with reference to FIG. 11, banknotes discharged from the loading and collecting bin 8 are checked by the banknote checking part 3 as to their denominations and states, and are then stored in banknote units, respectively in accordance with their denominations and states.

Collecting operation in this embodiment will be explained with reference to FIGS. 12 and 13.

Figure 12:
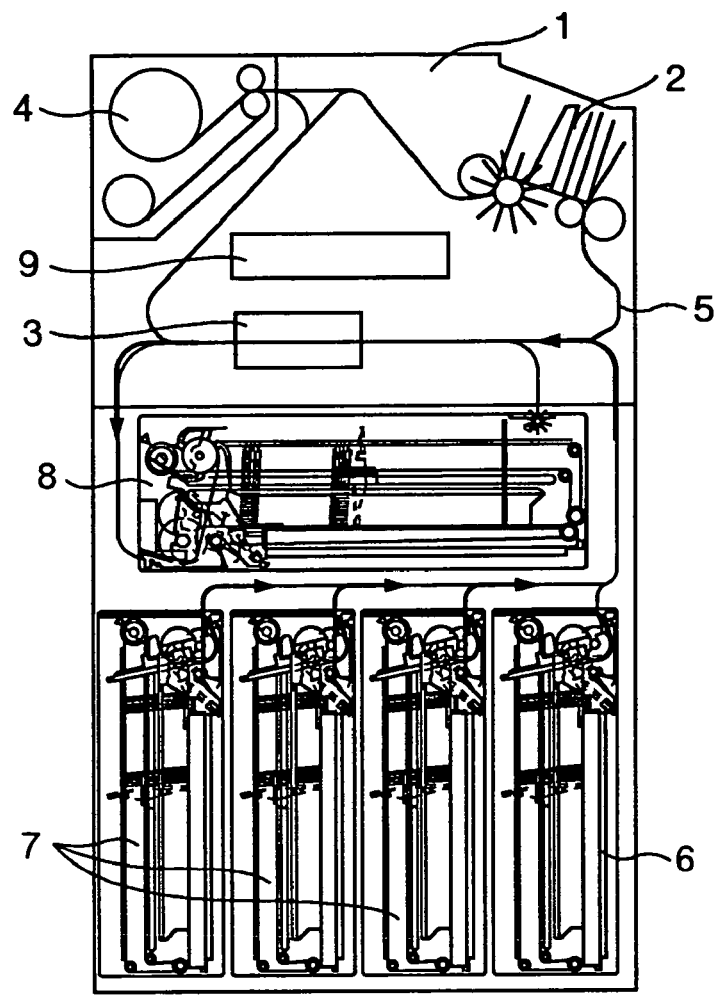
FIG. 12 is a sectional view illustrating the banknote receipt and payout apparatus during banknote collecting operation in an embodiment.

FIG. 12 is a sectional view illustrating the automatic teller machine during collecting operation.

Figure 13:
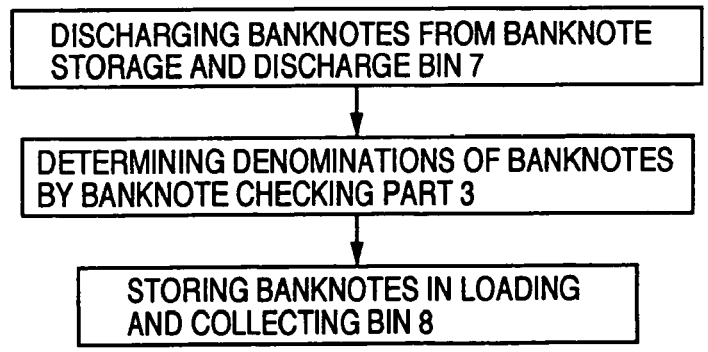
FIG. 13 is a flow chart for banknote collecting operation in an embodiment.

FIG. 13 is a flow chart for explaining collecting operation in this embodiment.

Referring to FIG. 12, the collection of banknotes is carried in such a case that collection of banknotes in the banknote storage and discharge bins 7 is required, that is, when banknotes are collected from the automatic teller machine 101 as shown in FIG. 1, for example, after completion of operation or when the number of banknotes stored in the banknote storage and discharge bins 7 becomes excessive during operation so that no more banknotes cannot be stored therein.

That is, banknotes are paid out from the banknote storage and discharge bins 7, being checked by the banknote checking part 3 as to their denominations and states, and they are stored in the loading and collecting bin 8. Next, the loading and collecting bin 8 are removed from the banknote receipt and payout apparatus 1 so that the collecting operation is completed. It is noted that the collection of reject banknotes stored in the receipt bin 6 is made by directly removing the receipt bin 6.

It is noted that there may be used a method of storing banknotes which has been set in the receipt and payout opening 2, directly into the loading and collecting bin 8 by transferring them from the receipt and payout opening 2 by way of the banknote checking part 3 without transferring and storing into the banknote storage and discharge bins 7 as a countermeasure against such a fact that banknotes are additionally received in the case wherein a number of banknotes stored in the banknote storage and discharge bins 7 becomes excessive during operation, and accordingly, no more banknotes cannot be further stored therein.

Further, during the above-mentioned collecting operation or loading operation, by continuously carrying out the operation other than installation and removable of the loading and collecting bin 8 into and from the banknote receipt and payout apparatus 1, the number of banknotes in each of the banknote storage and discharge bins 7 can be counted.

The series of collecting operation will be explained with reference to the flow-chart in FIG. 13.

Banknotes discharged from the banknote storage and discharge bins 7 are checked by the banknote checking part 3 as to their denominations and states, and then are stored in the loading and collecting bin 8.

Next, detailed explanation will be explained of the loading and collecting bin 8 in this embodiment with reference to FIGS. 14, 15 and 16.

Figure 14:
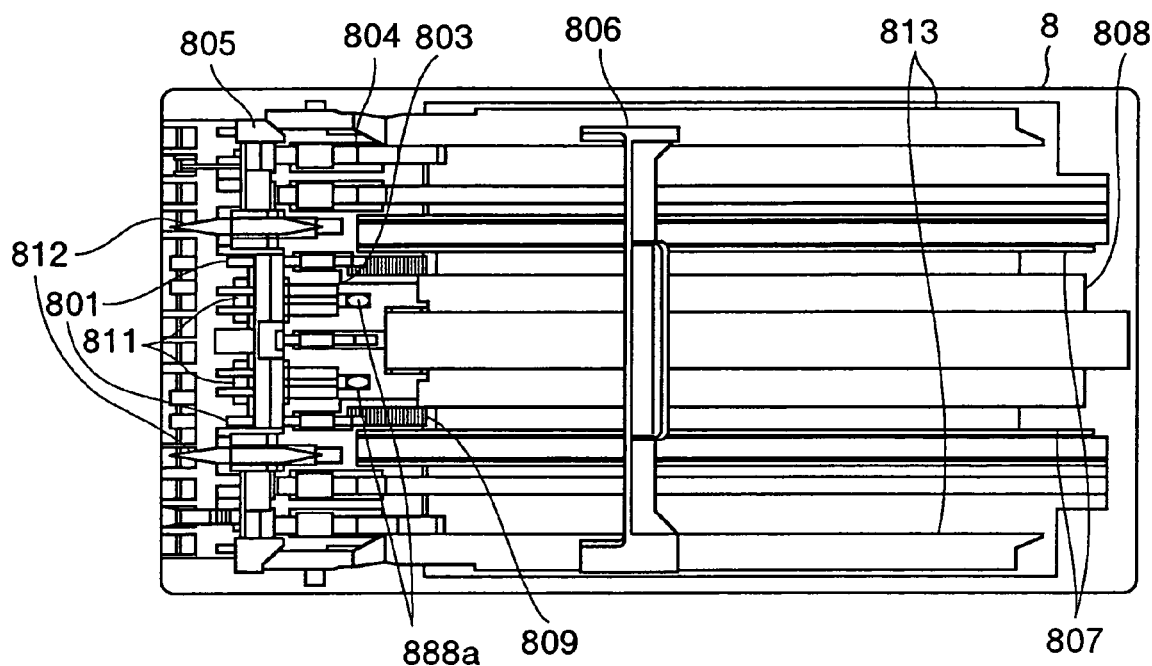
FIG. 14 is a top view illustrating a loading and collecting bin which is installed in the banknote receipt and payout apparatus.

FIG. 14 is a top view illustrating the configuration of the loading and collecting bin 8 adapted to be installed in the banknote receipt and payout apparatus 1.

Figure 15:
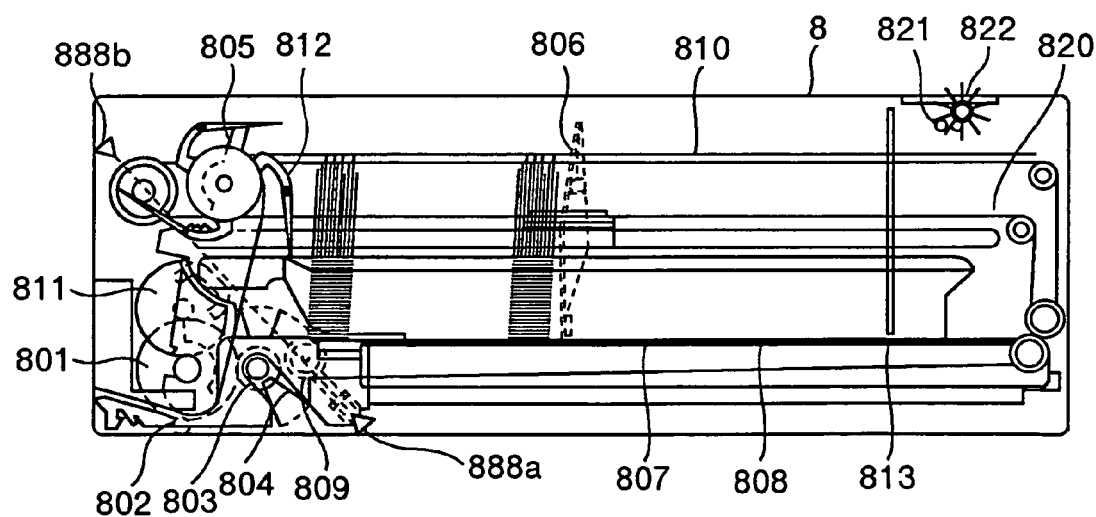
FIG. 15 is a side view illustrating a loading and collecting bin during such an operation that banknotes are stored in the loading and collecting bin.

FIG. 15 is a side view illustrating the loading and collecting bin 8 in a condition in which banknotes are stored therein.

Figure 16:
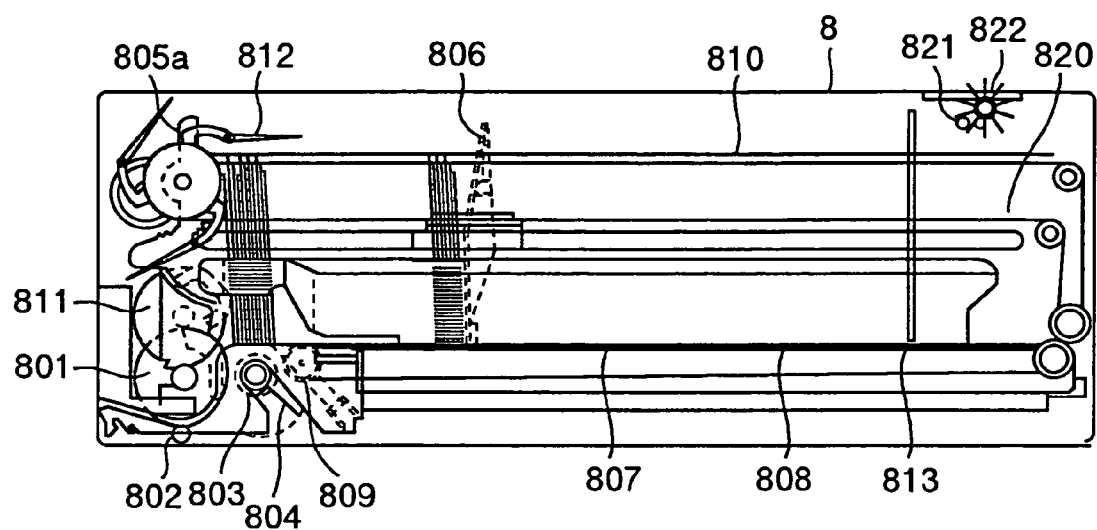
FIG. 16 is a side view illustrating the loading and collecting bin during such an operation that banknotes are discharged form the loading and collecting bin.

FIG. 16 is a side view illustrating the loading and collecting bin 8 in a condition in which banknotes are discharged therefrom.

By the way, in the case of carrying out loading or collecting of banknotes, it is required to store several kinds of banknotes, being intermingled, in a single banknote storage and discharge bin. If the banknotes have different sizes among their denominations, the loading and collecting bin 8 which can store therein intermingled banknotes having different sizes is required.

Such a loading and collecting bin 8 is a horizontal banknote cassette in which banknotes are stacked in a standing posture and which can store therein banknotes and can separate them from one another and pay out them.

Referring to FIGS. 14, 15 and 16, a banknote take-in and -out mechanism is composed of stack feed rollers 801, pick-up rollers 811, back-up rollers 802 which carries out driven rotation, gate rollers 803 which are rotated in a banknote storing direction but are not in a payout direction, brush rollers 804 which are coaxial with the gate rollers 803 and in which flexible push-in blades are radially arranged, and separation and stack guides 805 whose position is changed between separating operation and stacking operation.

The stack feed rollers 801 are driven for rotation by a drive source (which is not shown) through the intermediary of gears so as to feed banknotes to be stored into a take-in space or to feed banknotes to be discharged onto the transfer path 5. The back-up rollers 802 are rotated being driven by the stack feed rollers 801 so as to pinch a banknote between themselves and the stack feed rollers 801 in order to feed the banknote. The gate rollers 803 are rotated being driven by the stack feed rollers 801 when banknotes are stored, but they are not rotated when banknotes are discharged. That is, when the banknotes are separated from one another and paid out by the pick-up rollers 811 and the stack feed rollers 801, a banknote adjacent to a banknote to be discharged makes contact with the gate roller 803 so as to be prevented from being paid out following the banknote to be discharged.

The stack feed rollers 801 and the gate rollers 803 define a take-in slot into the take-in space. That is, during storage of a banknote, when pinching between the stack feed roller 801 and the gate rollers 803 is released, a banknote is unstrained except making contact with the separation and stack guide 805, and accordingly, the banknote is taken into the take-in space.

It is noted that the brush roller 804 have the flexible push-in blades provided only over about a half of its circumferential length. When a banknote is stored, it is rotated in the banknote storing direction so that the radially arranged flexible blades scrape banknotes stacked in the take-in space so as to be led into a storage space. When banknotes are discharge, the brush rollers 804 are rotated so that their parts having no flexible blades are rotated to a position where the flexible blades are retracted from the take-in space. Accordingly, the flexible blades do never interfere with banknotes to be discharged during discharge thereof.

Further, the pick-up rollers 811 and the stack feed rollers 801 are driven being synchronized with each other, and further, the brush rollers 804 are driven in a direction reverse to that of the stack rollers 801. With this configuration, it is possible to aim at commonly using a drive source. It is noted that the brush rollers 804 are coupled to the stack feed rollers 801 through the intermediary of a one-way clutch so that the brush rollers 804 are not rotated during discharge of banknotes. It is noted that the one way clutch is the one which can be rotated in one direction, but it cannot be rotated in a direction reverse to the former, and as shown in FIG. 15, it is rotated clockwise but is not rotated counterclockwise.

The separation and stack guide 805 serve as a banknote guide surface on the take-in side thereof so as to guide a surface of a banknote during storing and discharging thereof. When a banknote is stored, the banknote guide surface is located on an extension of a take-in and discharge slot of the take-in and -out mechanism in the banknote advancing direction. When banknotes are discharged, the banknote guide surface is retracted up to a position where the banknotes are separated from one another by the pick-up rollers 806 one by one.

The storage space is defined being surrounded by a bottom panel 808, a bottom surface belt 807 which is suspended above the bottom panel 808 so as to support the lower ends of stored banknotes, a pusher plate 806, the separation and stack guides 805, a top panel 810 and side walls 813.

The attaching positions of the side walls 813 can be adjusted in accordance with sizes of the banknotes. The width between the side walls is suitably set to a value which is larger than the widthwise size of banknotes by about 2 to 10 mm. Further, the distance between the bottom panel 808 and the top panel 810 is set to a value which is greater than a heightwise length of a banknote having a maximum size.

The loading and collecting bin 8 is provided with stack assist members 812 for guiding the leading end part, as viewed in the advancing direction, of a banknote to be stored, above the separation and stack guides 805 so as to handle banknotes having different sizes. The stack assist member 812 is controlled by the control portion 9 (shown in FIGS. 3 and 4) in accordance with date related to a size of a banknote to be stored.

Figure 17:
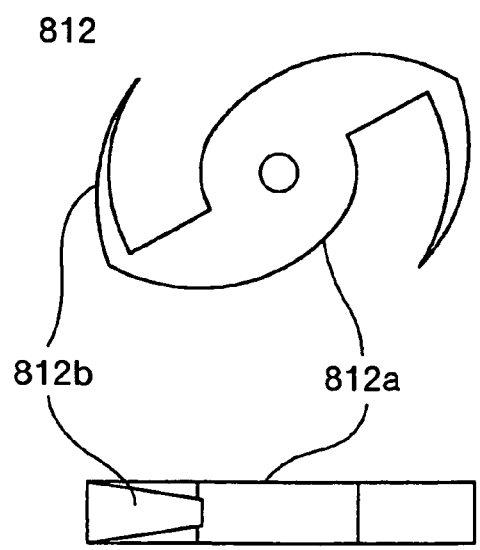
FIG. 17 is a view illustrating a configuration of a stack assist member.

FIG. 17 is a view which shows a configuration of the stack assists member 812.

Referring to FIG. 17, the stack assist member 812 is composed of a roller part 812a and blade parts 812b. The stack assist member 812 is incorporated so that the outer peripheral surface of the roller part 812a is located on an extension of the banknote guide surface of the separation and stack guide 805.

Explanation will be hereinbelow made of the blade parts 812b. When the blade part 182b is located in the storage space, the inside of a bent part of the blade part 812b and the outer peripheral surface of the roller part 812a define therebetween a take-in space, and the inside of the bent part of the blade part 812b limits an excessive advance of a banknote transferred into the take-in space through the take-in and -out mechanism.

The blade part 812b defines a boundary between the take-in space and the storage space. With this arrangement, a banknote which is taken into the take-in space in a standing posture can be prevented from falling down, and is therefore stably stored. Further, banknotes stored in the storage space can be prevented from falling down toward the take-in space, thereby it is possible to prevent a banknote to be taken in and a stored banknote from interfering with each other.

The rotation of the stack assist members 812 is controlled so as to set the distance from the take-in and -out slot to the banknote end stopper portion to a length corresponding to a size of a banknote.

The stack assist members 812 are provided by a plural number in the widthwise direction of a banknote as shown in FIG. 14, and the upper end of a banknote to be stored is guided at plural positions into the take-in space. Accordingly, a banknote even having kinking such as tendency of curving or folding can be stably stored with no interference with a following banknotes.

A transmission sensor shown in FIG. 15 is composed of a light emitting element 888a and a light receiving element 888b. Since a light beam is blocked by a banknote which is present in the vicinity of the take-in and -out slot, and accordingly, it is possible to detect a banknote which is present in the vicinity of the take-in -out slot. If the time by which the light beam is blocked becomes longer during the storing, the pusher plate 806 is driven so as to widen the banknote storage space.

It is noted that a banknote which is determined to be rejected is transferred into by way of the rollers 821 and the brush rollers 822 and is stored in a reject banknote storage part 820.

As shown in FIG. 16, in order to discharge banknotes from the loading and collecting bin 8, the separation and stack guides 805 and the stack assist members 812 are retracted away from the storage space, different from take-in operation of banknotes. Stored banknotes are pressed toward the separation and stack guides 805 by the pusher plate 806, and then the pick-up rollers 811 are rotated so that the banknotes are discharged one by one from the loading and collecting bin 8 by way of the take-in and -out mechanism.

Next, detailed explanation will be made of the banknote storage and discharge bin 7 in this embodiment with reference to FIGS. 18 and 19.

Figure 18:
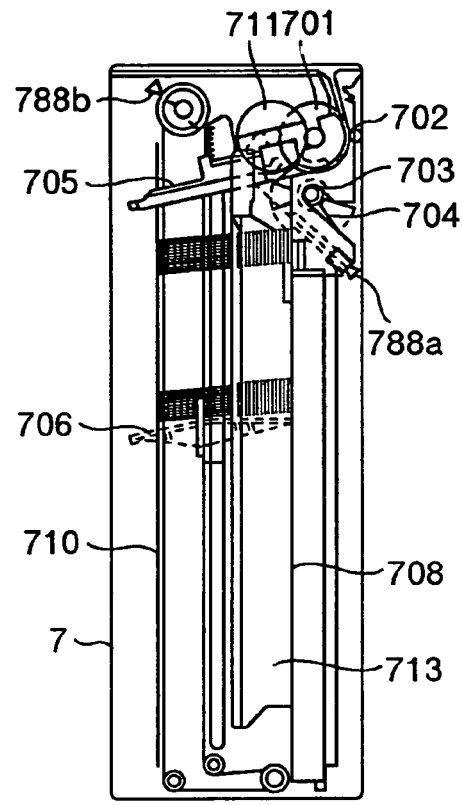
FIG. 18 is a side view illustrating the banknote storage and discharge bin during such an operation that banknotes are stored therein.

FIG. 18 is a side view illustrating the banknote storage and discharge bin 7 in a condition in which banknotes are stored therein.

Figure 19:
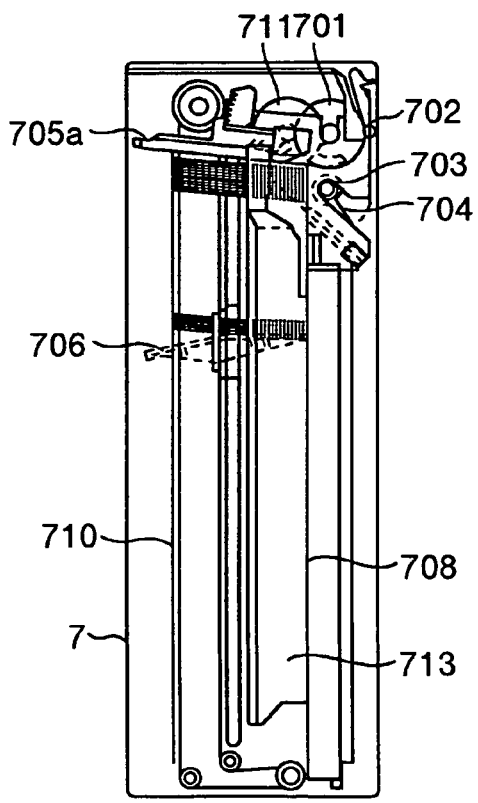
FIG. 19 is a side view illustrating the banknote storage and discharge bin during such an operation that banknotes are stored therefrom.

FIG. 19 is a side view illustrating the banknote storage and discharge bin in a condition in which banknotes are discharged therefrom.

Referring to FIGS. 18 and 19, in order to carry out receipt and pay-out of money, it is required to store only one denomination of banknotes in a single banknote storage and discharge bin 7. This banknote storage and discharge bin 7 is a vertical cassette in which banknotes are stacked therein a horizontal posture, and into and from which banknotes can be stored and discharged.

The take-in and -out mechanism for banknotes is composed of stack feed rollers 701, pick-up rollers 711, back-up rollers 703 which are driven in rotation, gate rollers 703 which are rotated in the storing direction of banknotes, but which are not rotated in the pay-out direction thereof, brush rollers 704 which are coaxial with the gate rollers 703 and in which flexible push-in blades are radially arranged, and separation and stack guides 705 whose positions are changed between separating operation and stacking operation.

The stack feed rollers 701 driven by a drive source (which is not shown) through the intermediary of gears. It feeds banknotes to be stored into a take-in space, and further, transfers banknotes to be discharged onto the transfer path 5. The back-up rollers 702 are rotated being driven by the stack feed rollers 701 so as to pinch a banknote between itself and the stack feed rollers 701 in order to transfer the banknote. The gate rollers 703 are rotated being driven by the stack feed rollers 801 when banknotes are stored but are not rotated when banknotes are discharged. That is, when banknotes are separated and paid out by the pick-up rollers 711 and the stack feed rollers 701, a banknote adjacent to a discharged banknote is made into contact with the gate rollers 703, and accordingly, it is prevented from being discharged following the discharged banknote.

The stack feed roller 701 and the gate roller 703 define therebetween a take-in and -out slot for the take-in space. That is, when the pinching between the stack feed rollers 701 and the gate rollers 703 is released, a banknote becomes unconstraint except making contact with the stack feed rollers 701 and the gate rollers 703, and accordingly, the banknote is introduced into the take-in space.

It is noted that the brush rollers 704 incorporate the flexible push-in blades only over a half of the circumference thereof in order to enable discharge operation for banknotes. When banknotes are stored, the brush rollers 704 are rotated in the storing direction so as to scrape stacked banknotes from the take-in space by means of the radially arranged flexible push-in blades into the storage space. When banknotes are discharged, the brush rollers 704 are rotated so that the flexible push-in blades are retracted from the take-in space. Thus, discharged banknotes are prevented from interfering with the flexible push-in blades.

Further, the pick-up rollers 711 are driven in synchronization with the stack feed roller 701, and the brush rollers 704 are driven in rotation reverse to that of the stack feed rollers 701. With this configuration, it is possible to commonly use a drive source.

It is noted that the brush rollers 704 are coupled with the stack feed rollers 701 through the intermediary of an one-way clutch, and accordingly, during discharge of banknotes, the brush rollers are not rotated. Further, the one-way clutch is adapted to be rotated in one direction but to be not rotated in a direction reverse to the one direction. The one-way clutch shown in FIG. 18 is rotated counterclockwise but is not rotated clockwise.

The separation and stack guide 705 defines a banknote guide surface on the take-in space side, for guiding a surface of a banknote during storing or discharging of the banknote. During storing of a banknote, the banknote guide surface is located at a position which is along an extension in the banknote advancing direction from the take-in and -out slot of the banknote take-in and -out mechanism. During discharge of a banknote, the banknote guide surface guides banknotes up to a position where they can be separated one by one by the pick-up rollers 706.

The storage space is defined being surrounded by a side panel 708, a pusher plate 706, the separation and stack guides 705, and a movable side panel 710 and side walls 713.

The attaching positions of the side walls 713 and the movable side panel 710 can be adjusted in accordance with a size of a banknote. The width between the side walls 713 is suitably set to a value which is greater than a widthwise size of a banknote by about 2 to 10 mm. Further, the attaching position of the movable side panel 710 is suitably set so that a distance between the side panel 708 and the movable side panel 710 is set to a value which is greater than a size of a banknote which can be handled in the banknote receipt and payout apparatus 1 by about 2 mm.

A transmission sensor is composed of a light emitting element 788a and a light receiving element 788b. Since a light beam is blocked by a banknote which is present in the vicinity of the take-in and -out slot, it is possible to detect a banknote which is present in the vicinity of the take-in and -out slot. During storing of banknotes, if the time by which the light beam is blocked by a banknote becomes longer, the pusher plate 706 is moved so as to widen the banknote storage space.

As shown in FIG. 19, when the banknotes are discharged from the storage and discharge bin 7, the separation and stack guides 705 and the stack assist members 712 are retracted away from the storage space, different from the take-in operation for banknotes. Stored banknotes are pressed toward the separation and stack guides 705, and the banknotes are separated by the pick-up rollers 711 on rotation, one by one, and are discharged from the banknote storage and discharge bin 7 by way of the take-in and -out mechanism.

Embodiments other than those stated above will be explained with reference to FIGS. 20, 21, 22, 23, 24 and 25.

Figure 20:
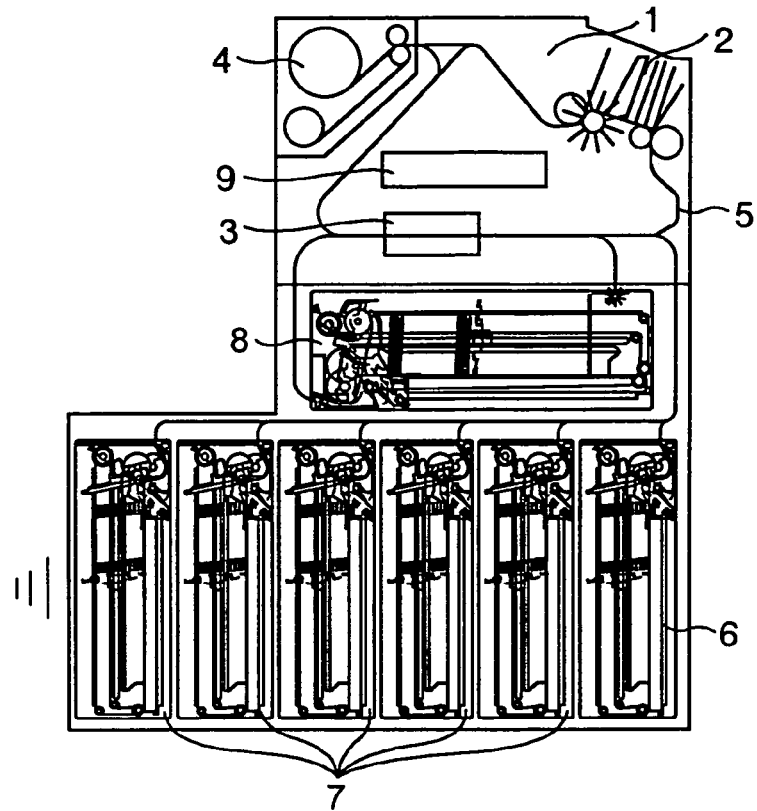
FIG. 20 is a configuration view illustrating a banknote receipt and payout apparatus incorporating another embodiment.

As shown in FIG. 20, the number of the banknote storage and discharge bins may be increased in the banknote receipt and payout apparatus. Thus, the banknote storage and discharge bins 7 can be added without changing the height of the receipt and payout opening.

Figure 21:
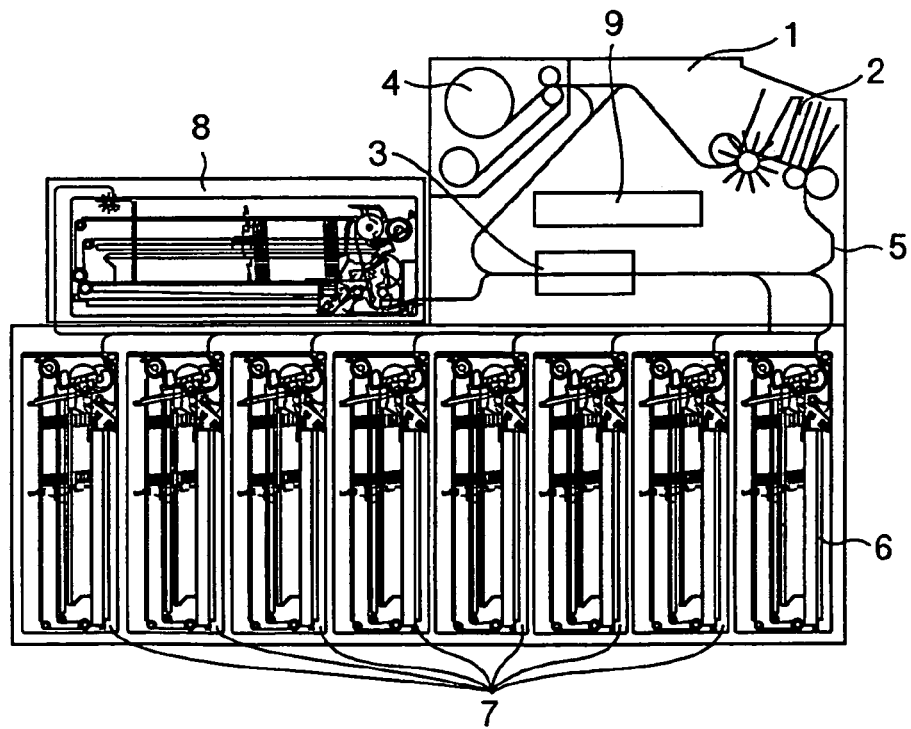
FIG. 21 is a configuration view illustrating a banknote receipt and payout apparatus incorporating another embodiment.

As shown in FIG. 21, by arranging the loading and collecting bin 8 above the added banknote storage and discharge bins 7, the height of the banknote receipt and payout apparatus can be decreased.

Figure 22:
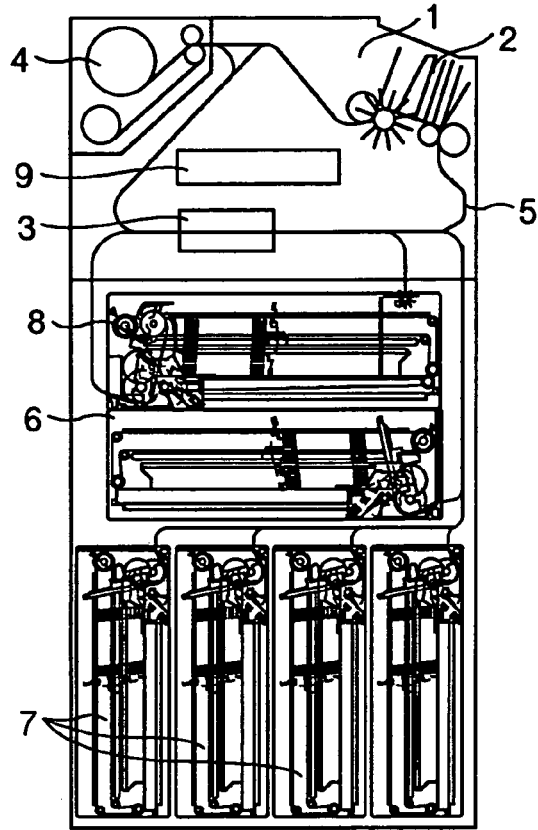
FIG. 22 is a configuration view illustrating a banknote receipt and payout apparatus incorporating another embodiment.

As shown in FIG. 22, the receipt bin 6 and the loading and collecting bin 8 may be horizontal banknote cassettes, and the banknote storage and discharge bins 7 may be vertical banknote cassettes.

Figure 23:
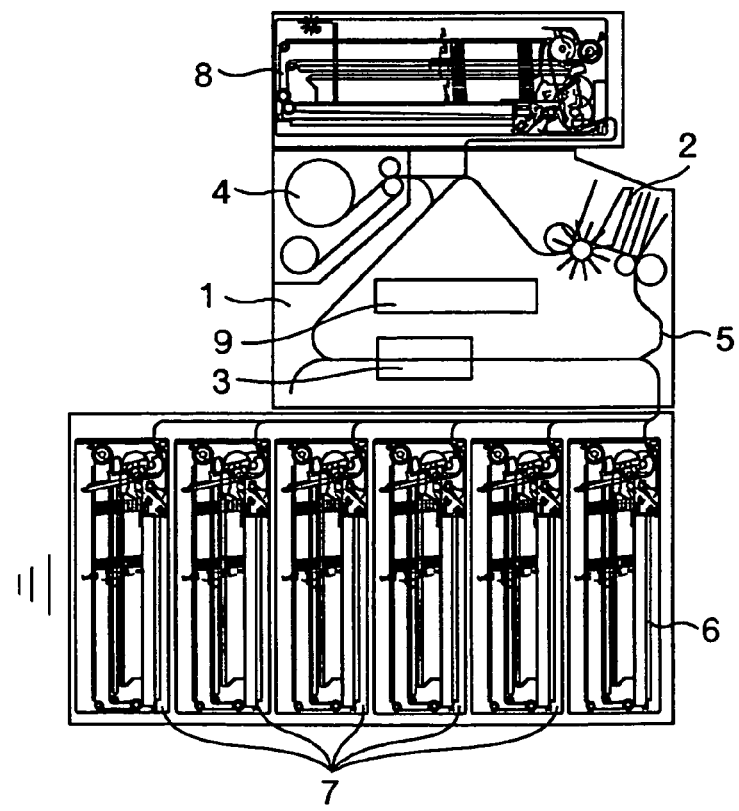
FIG. 23 is a configuration view illustrating a banknote receipt and payout apparatus incorporating another embodiment.

As shown in FIG. 23, by arranging the loading and collecting bin 8 above the receipt and payout opening 2, the height of the receipt and payout opening can be decreased.

Figure 24:
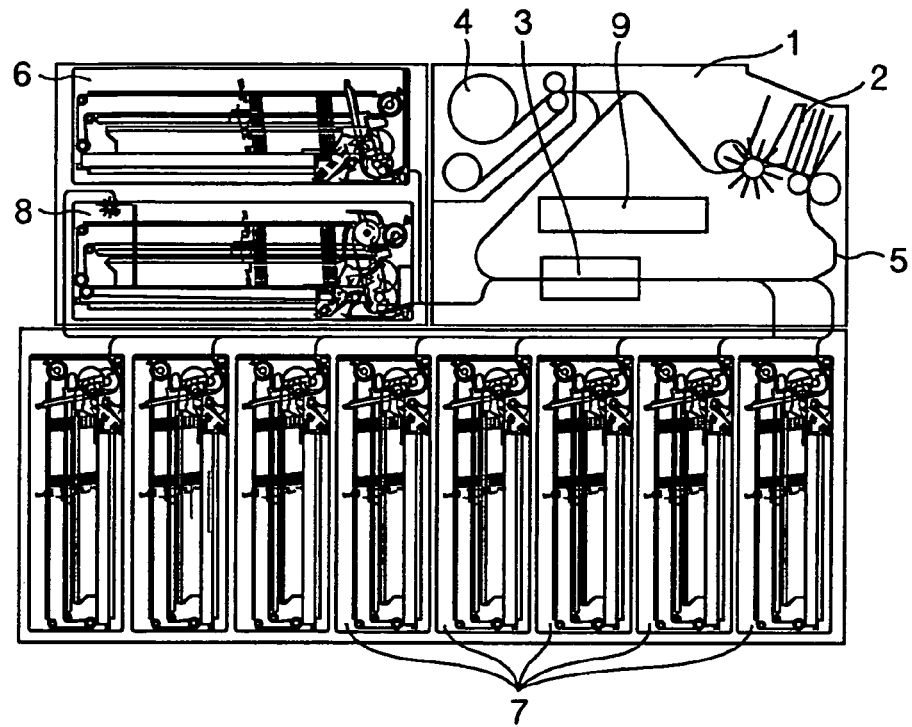
FIG. 24 is a configuration view illustrating a banknote receipt and payout apparatus incorporating another embodiment.

As shown in FIG. 24, by arranging the receipt bin 6 and the loading and collecting bin 8 above the added banknote storage and discharge bins 7, the height of the banknote receipt and payout apparatus can be decreased.

Figure 25:
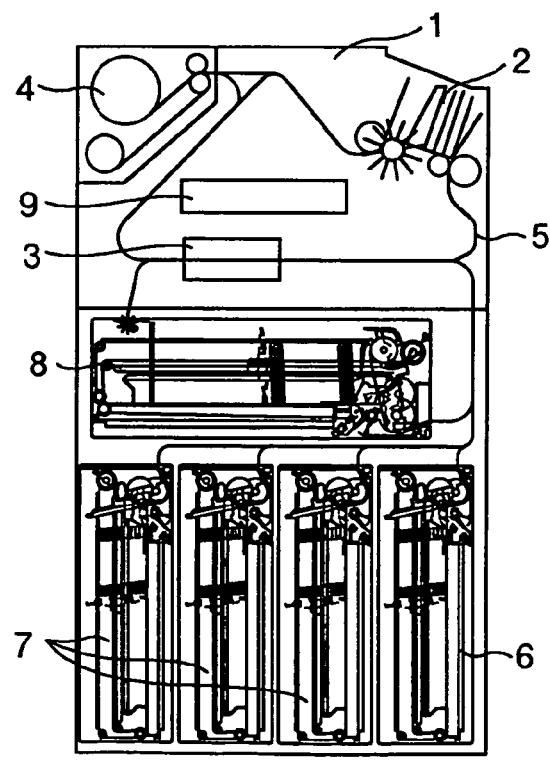
FIG. 25 is a configuration view illustrating a banknote receipt and payout apparatus incorporating another embodiment.

As shown in FIG. 25, there may be used even such a configuration that the direction of the loading and collecting bin 8 is changed so as to reduce the length of a transfer path. With this configuration, banknotes are transferred between the banknote storage bins 7 and the loading and collecting bin 8 by way of the temporary storage part 4 when loading, collecting or precise motion is carried out.

Explanation will be made of the stream of banknotes during loading within the banknote receipt and payout apparatus 1 shown in FIG. 25.

At first, banknotes are paid out from the loading and collecting bin 8 onto the transfer path 5. Further, the banknotes paid out on the transfer path 5 are transferred by way of the banknote checking part 3 so as to determine their denomination and a number of them, and are once stored in the temporary storage part 4. Next, the banknotes stored in the temporary storage part 4 are determined as to their states by the banknote checking part 3 whenever it is necessary, unusable banknotes are transferred to and stored in the reject banknote storage part 820 in the loading and collecting part 8, but banknotes to be stored in the banknote storage and discharge bins 7 are transferred thereto, and stored therein, respectively in accordance with their denominations.

Figure 26:
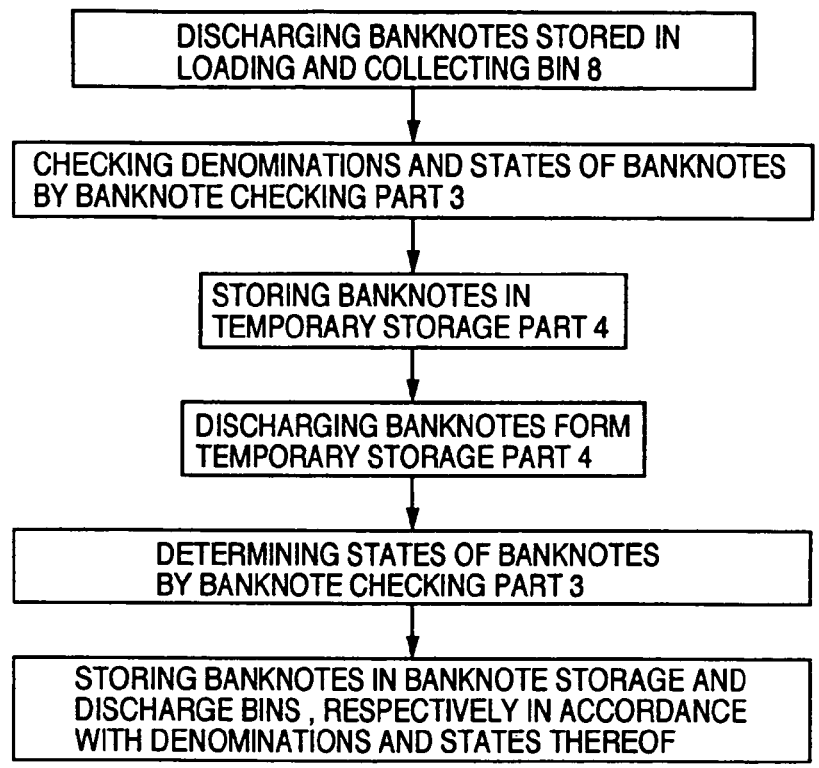
FIG. 26 is a flow chart for a banknote receipt and payout apparatus incorporating another embodiment.

FIG. 26 is a flow chart for explaining the stream of banknotes during unloading in the banknote receipt and payout apparatus 1 shown in FIG. 25.

Referring to FIG. 26, at first, banknotes are paid out from the banknote storage bin 7 onto the transfer path 5. Then, the banknotes paid out on the transfer path 5 are transferred by way of the banknote checking part 3 so as to determine their denominations and a number of them, and are stored once in the temporary storage part 4. Next, the banknotes stored in the temporary storage part 4 are determined as to their states by the banknote checking part 3 whenever it is necessary, and then are stored in the loading and collecting bin 8.

Figure 27:
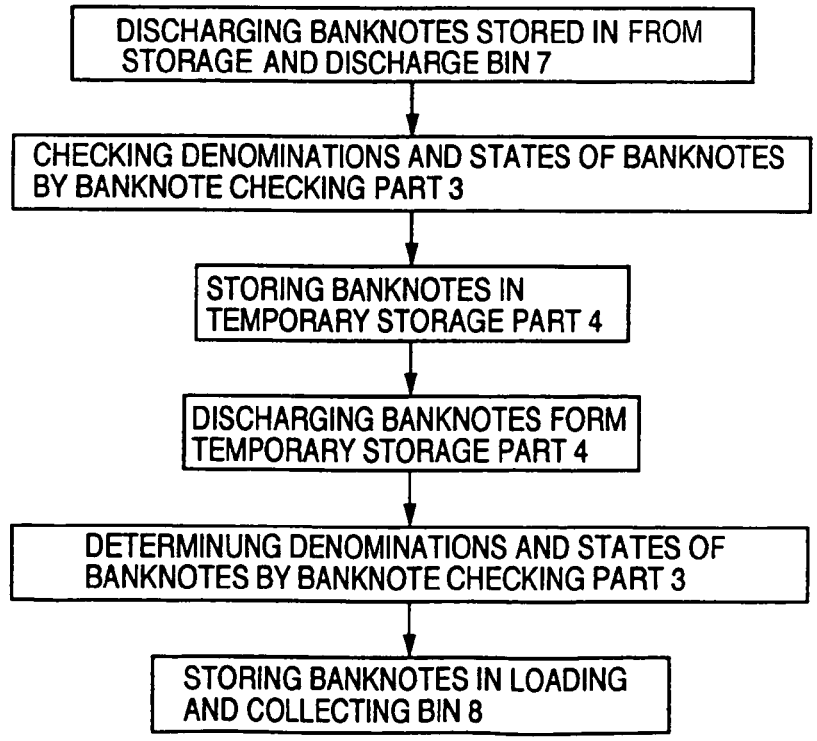
FIG. 27 is a flow chart for a banknote receipt and payout apparatus incorporating another embodiment.

FIG. 27 is a flow chart for explaining the stream of banknotes during collecting within the banknote receipt and payout apparatus 1 shown in FIG. 25.

Referring to FIG. 27, banknotes discharged from the banknote storage and discharge bins 7 are stored in the temporary storage part 4 after their denominations and a number of them are determined by the banknote checking part 3, and the banknotes discharged from the temporary storage 7 with a suitable timing are determined again as to their denomination and states, and thereafter, stored in the loading and collecting bin.

It is noted that the collecting operation and the loading operation may be continuously carried out so as to count a number of banknotes in each of the banknote storage and discharge bins 7.

According to the present invention, the loading and collecting bin is of a horizontal type while the banknote storage and discharge bins are of a vertical type, and accordingly, there can be provided a banknote receipt and payout apparatus which can handle several denominations of banknotes, having a loading and collecting function, and which is capable of handling several kinds of denominations.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A banknote receipt and payout apparatus comprising:
   a receipt and payout opening for carrying out either or both of payout and receiving of banknotes, each banknote having long length sides and short length sides;
   a banknote determining part for determining denominations of banknotes;
   one or more banknote storage and discharge bins arranged to store therein and discharge therefrom different denominations respectively;
   a receipt bin arranged to store the banknotes;
   a transfer path connecting among the receipt and payout opening, the banknote determining part, the banknote storage and discharge bins and the receipt bin, for transferring the banknotes;
   a loading and collecting bin arranged to load and collect the banknotes into and from the banknote storage and discharge bins, for accommodating therein different denominations of banknotes in such a standing posture that their short length sides are vertically extended while their long length sides are horizontally extended; and
   at least one stack assist member to vertically delimit a size of introduction of a banknote to be introduced into the loading and collecting bin, to a value which is substantially equal to a size of the short length sides of the banknote to be introduced into the loading and collecting bin;
   wherein the banknotes are vertically stacked in the storage and discharge bins, and are horizontally stacked in the receipt bin and the loading and collecting bin.

2. A banknote receipt and payout apparatus as set forth in claim 1, wherein the storage and discharge bins and the receipt bin can be drawn out from the apparatus in a horizontal direction.

3. A banknote receipt and payout apparatus as set forth in claim 1 or 2, wherein a number of the storage and discharge bins provided corresponds to a number of denominations to be accepted, and are horizontally arranged in a vertically standing posture.

4. A banknote receipt and payout apparatus comprising:
   a receipt and payout opening for carrying out either or both of payout and receiving of banknotes, each banknote having long length sides and short length sides;
   a banknote determining part for determining denominations of banknotes;
   one or more banknote storage and discharge bins arranged to store therein and discharge therefrom different-sized denominations, respectively;
   a receipt bin arranged to store the banknotes;
   a transfer path connecting among the receipt and payout opening, the banknote determining part, the banknote storage and discharge bins and the receipt bin, for transferring the banknotes;
   a loading and collecting bin arranged to load and collect the banknotes into and from the banknote storage and discharge bins, for accommodating therein the different-sized denominations of banknotes in such a standing posture that their short length sides are vertically extended while their long length sides are horizontally extended; and
   at least one stack assist member having a portion thereof defining an introduction area for vertically delimiting a size of a banknote introduced into the loading and collecting bin, to a value which is substantially equal to a size of the short length sides of the banknote to be introduced into the loading and collecting bin;
   wherein the banknotes are vertically stacked in the storage and discharge bins, and are horizontally stacked in the receipt bin and the loading and collecting bin.

5. A banknote receipt and payout apparatus as set forth in claim 4, wherein the storage and discharge bins and the receipt bin can be drawn out from the apparatus in a horizontal direction.

6. A banknote receipt and payout apparatus as set forth in claim 4 or 5, wherein a number of the storage and discharge bins provided corresponds to a number of denominations to be accepted, and are horizontally arranged in a vertically standing posture.

* * * * *